United States Patent
Ball et al.

(10) Patent No.: US 6,421,431 B1
(45) Date of Patent: Jul. 16, 2002

(54) METHOD AND SYSTEM FOR VOICE TRANSMISSION OF A BINARY DATA SEQUENCE FROM A PIEZOELECTRIC TRANSDUCER

(75) Inventors: Eric Ball, Saint-Mande; Cédric Colnot, Ivry-sur-Seine, both of (FR)

(73) Assignee: Elva S.A., Boulogne (FR)

( * ) Notice: Subject to any disclaimer, the term of this patent is extended or adjusted under 35 U.S.C. 154(b) by 0 days.

(21) Appl. No.: 09/462,824
(22) PCT Filed: Jul. 3, 1998
(86) PCT No.: PCT/FR98/01422
 § 371 (c)(1),
 (2), (4) Date: Jan. 13, 2000
(87) PCT Pub. No.: WO99/04366
 PCT Pub. Date: Jan. 28, 1999

(30) Foreign Application Priority Data

Jul. 15, 1997 (FR) .............................. 97 08939

(51) Int. Cl.$^7$ ............................................. H04M 11/00
(52) U.S. Cl. .................. 379/93.37; 379/93.01; 379/93.02
(58) Field of Search ...................... 379/93.37, 110.01, 379/357.03, 93.02, 93.01

(56) References Cited

U.S. PATENT DOCUMENTS

| 3,905,030 | A | | 9/1975 | Lavanant et al. |
| 6,028,926 | A | * | 2/2000 | Henderson et al. ..... 379/357.03 |
| 6,236,724 | B1 | * | 5/2001 | Labaton et al. ........ 379/357.03 |
| 6,327,365 | B1 | * | 12/2001 | Kiger, II .................. 379/93.37 |

FOREIGN PATENT DOCUMENTS

| GB | 2 148 061 A | 5/1985 |
| WO | WO 92 20048 A | 11/1992 |

\* cited by examiner

Primary Examiner—Stella Woo
(74) Attorney, Agent, or Firm—Alston & Bird LLP

(57) ABSTRACT

A method and a system of transmitting a binary data sequence in voice form, the system comprising a pilot oscillator (OS), an FSK type modulator circuit (3) receiving said sequence, an intermediate processor circuit (5), and a piezoelectric transducer (P). A logic excitation signal is applied to the terminals (b1, b2) of the transducer (P) and is integrated by means of the capacitive portion of the impedance of the transducer (P) so as to reconstitute an acoustic signal having a sinusoidal waveform which is emitted by the transducer (P) at a voice frequency which differs depending on the logic state of the bit to be transmitted.

8 Claims, 1 Drawing Sheet

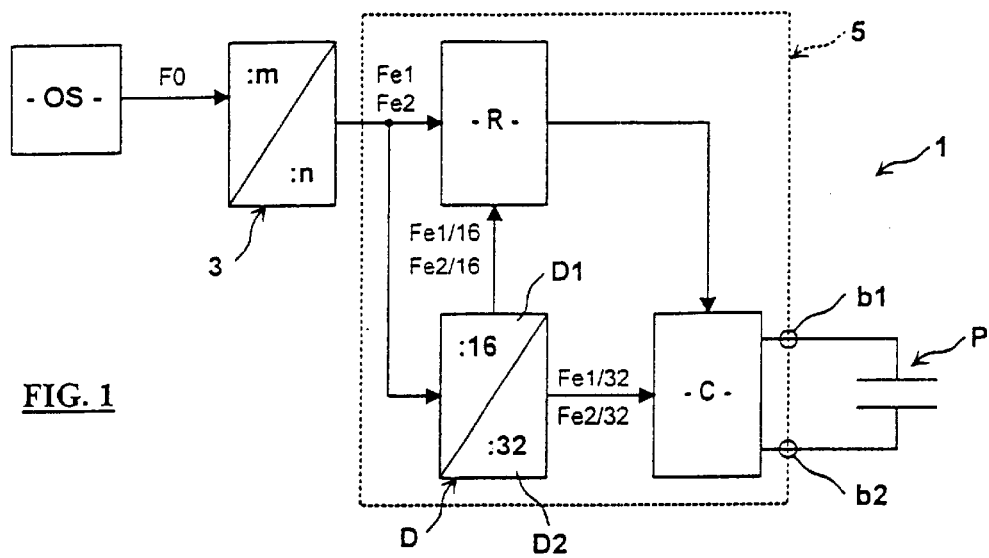
FIG. 1
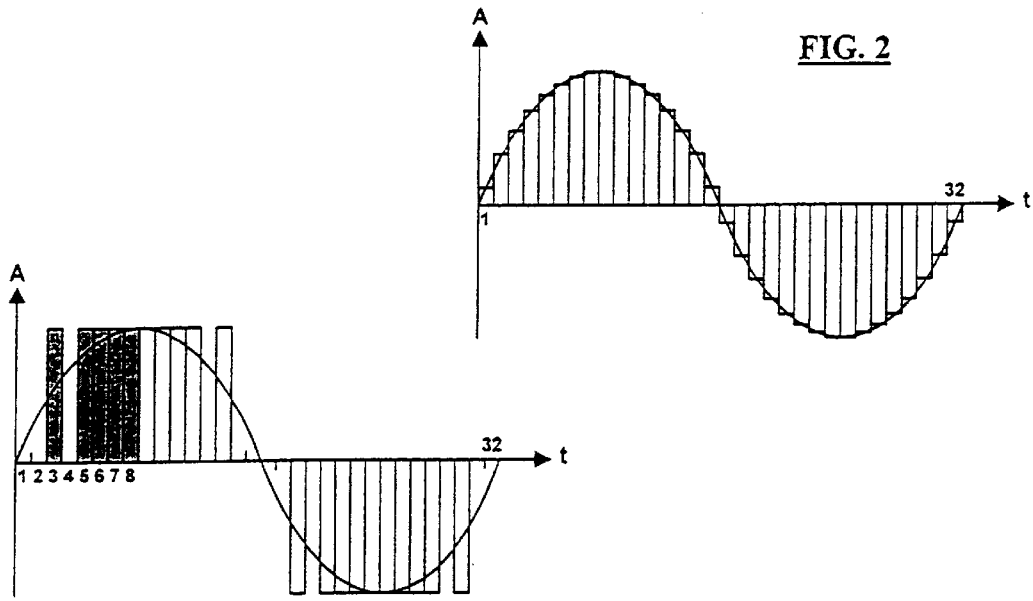
FIG. 2
FIG. 3
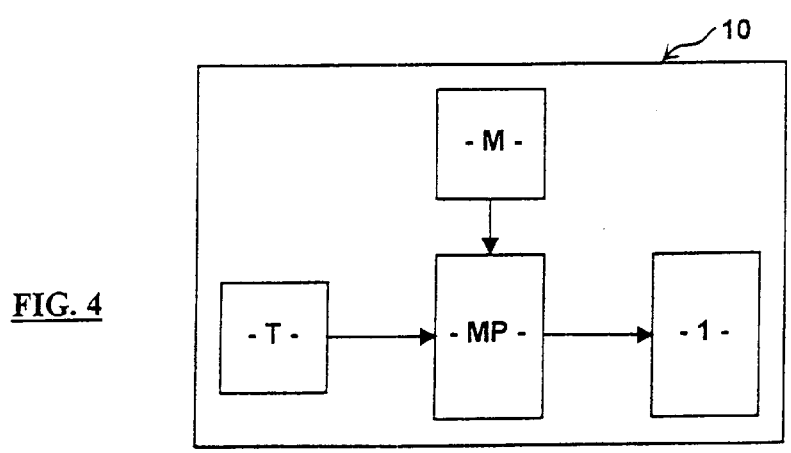
FIG. 4

METHOD AND SYSTEM FOR VOICE TRANSMISSION OF A BINARY DATA SEQUENCE FROM A PIEZOELECTRIC TRANSDUCER

The present invention relates to a method and to a system for transmitting a binary data sequence in voice form from a piezoelectric transducer.

It is now common practice to use a memory card or "smart" card merely as a key for giving access to a service or as means for transferring information that can be confidential or otherwise.

In most intended applications, the access to a service or the transfer of information is preceded by executing an identification protocol of the unidirectional or bidirectional type which takes account at least of an identification sequence that is prerecorded in a memory of the card.

When access to a service is performed remotely, it is known to make use of "voice" cards in which the identification sequence is converted into a sound signal which is transmitted over a telephone line via the microphone of the telephone handset.

In general, the identification sequence is transmitted via a piezoelectric transducer after being subjected to modulation of the frequency shift keying (FSK) type. Such modulation consists in emitting a carrier wave at a voice frequency that differs depending on the logic state of the bit to be transmitted. The term "voice frequency" is used to mean any frequency lying in the passband of the telephone network. That type of modulation is accepted as being the most suited for transmitting data by acoustic coupling with a telephone, because said modulation is relatively insensitive to noise or variation in the amplitude of the emitted signal.

The logic signal that results from FSK as applied to the piezoelectric transducer has a square waveform which is detrimental to good acoustic conversion. A squarewave signal generates numerous harmonics at levels that are almost as high as the level of the fundamental frequency. Such harmonics disturb transmission and are particularly disagreeable to the ear.

The object of the invention is to design a transmission method which mitigates the above-mentioned drawbacks while providing other advantages.

To this end, the invention provides a method of transmitting a binary data sequence in voice form from a piezoelectric transducer, the method being characterized in that it consists:

in defining a sinewave signal from a stream of pulses each having a logic "0" or a logic "1" state;

in generating a sampling frequency that differs depending on the logic state of the bit of the sequence that is to be transmitted;

in reading the stream of logic pulses at the sampling frequency corresponding to the logic state of the bit to be transmitted so as to obtain an intermediate logic signal;

in applying the intermediate logic signal alternately to one and then to the other of two input terminals of a piezoelectric transducer, at a voice frequency that differs depending on the logic state of the bit to be transmitted, so as to obtain a logic excitation signal made up of a positive half-cycle and of a negative half-cycle;

in reconstituting an acoustic signal having a sinusoidal waveform from the logic excitation signal by making use of the capacitive portion of the impedance of the piezoelectric transducer, in particular in the vicinity of its resonant frequency; and in causing the transducer to emit the acoustic signal of sinusoidal waveform at the voice frequency which corresponds to the logic state of the bit to be transmitted.

In the method, the sinewave signal can be defined from a stream of i logic pulses corresponding to a positive or a negative half-cycle of the signal, by storing said stream of pulses in an i-bit rotary register, and by reading said register at the sampling frequency corresponding to the logic state of the bit to be transmitted.

In a variant, the sinewave signal can be defined from a stream of j logic pulses corresponding to a positive or a negative quarter-cycle of the signal, by recording said stream of pulses in a j-bit rotary register, and by reading said register from left to right and then from right to left at the sampling frequency corresponding to the logic state of the bit to be transmitted.

It is important to emphasize that the method has been designed to operate on logic signals only and using a single time base, thereby providing the particular advantage of being suitable for implementation using logic circuits that are simple, reliable, and of low cost.

Any analog solution would necessarily give rise to a physical embodiment that is complex, not-robust, and expensive.

The invention also provides a system for implementing the method, such a system being easily integrated in a voice type memory card of standard dimensions.

Other advantages, characteristics, and details of the invention appear from the description below given with reference to the accompanying drawing, given purely by way of example, and in which:

FIG. 1 is a block diagram of a system of the invention for transmitting a binary data sequence in voice form;

FIG. 2 is a graph showing a conventional method of sampling for defining a sinewave signal using a succession of logic pulses;

FIG. 3 is a graph showing a different sampling method used in the transmission system of the invention; and FIG. 4 is a block diagram of the transmission system of the invention as integrated in a voice type memory card.

The transmission system 1 shown in FIG. 1 is designed to transmit a binary data sequence in voice form from a piezoelectric transducer P.

The transmission system 1 comprises in particular:

a pilot oscillator OS which delivers a periodic signal of frequency F0;

an FSK type modulator circuit 3 connected to the oscillator OS and also receiving the binary data sequence for transmission, so as to generate a different sampling frequency Fe1 or Fe2 depending on the logic state of the bit to be transmitted;

an intermediate processing circuit 5 connected to the modulator circuit 3 to generate an intermediate logic signal; and the piezoelectric transducer P whose two input terminals b1 and b2 are connected to the intermediate processor circuit 5 via a switch circuit C to apply the intermediate logic signal in alternation on each of the input terminals b1 and b2 at a voice frequency that differs depending on the logic state of the bit to be transmitted.

The FSK type modulator circuit 3 is constituted, for example, by a divide-by-m circuit and by a divide-by-n circuit, and the two divider circuits are associated with logic states "0" and "1", respectively.

In general, the intermediate circuit 5 operates on logic signals only, and its function is to generate an intermediate logic signal which is applied to the piezoelectric transducer P and which enables it to reconstitute an acoustic signal having a sinusoidal waveform from said logic signal and to emit the sinewave signal at a voice frequency corresponding to the logic state of the bit to be transmitted.

Before describing the intermediate circuit 5, it is helpful to refer to FIG. 1 which shows a conventional sampling method that makes it possible to define and to reconstitute a sinewave signal from a digital data stream, where the data is represented by voltage levels. In the example shown, each voltage level A of the signal is encoded on four bits, for example, giving sixteen levels in all, and one period of the signal is defined by thirty-two samples. In this method of sampling, the main difficulty lies in generating the voltage levels A in analog manner.

In contrast, in a novel method of sampling implemented by the intermediate circuit 5, a sinewave signal can be defined and reconstituted from pulses having logic states "0" and "1". These logic pulses, e.g. thirty-two of them, are selected in such a manner as to convey a quantity of energy that is equivalent to that of a sinewave. Specifically, the sinewave signal is defined by a succession of i pulses each having a logic state "0" or "1", said logic pulses enabling at least one positive or negative half-cycle of the sinewave signal to be reconstituted.

In a variant, the sinewave signal is defined using j logic pulses to reconstitute at least one positive or negative quarter-cycle of the sinewave signal. Thus, as shown in FIG. 3, a positive or a negative quarter-cycle of the sinewave signal can be defined using a stream of eight logic pulses having the following states: "00101111"; it then suffices to record these eight logic states in a rotary eight-bit register and thereafter to read said register from left to right and then from right to left in order to reconstitute a positive or a negative half-cycle of the sinewave signal.

The frequency of the sinewave signal that is obtained depends on the sampling frequency, i.e. on the frequency at which the register is read. Thus, FSK modulation is implemented by alternating two different values for the sampling frequency. In addition, the waveform of the signal is easily modified since it depends solely on the way the rotary register is programmed.

In general, it is the capacitive portion of the impedance of the piezoelectric transducer P that is used, making the transducer perform an integration function so as to reconstitute a sinewave acoustic signal from the logic pulses applied thereto by the intermediate circuit 5, it being understood that this impedance becomes essentially capacitive when the transducer P is excited close to its resonant frequency.

Specifically, with reference to FIG. 1, the intermediate circuit 5 comprises an eight-bit rotary register R storing the eight logic states "00101111" that define a positive quarter-cycle of the sinewave signal shown in FIG. 3. The register R is connected to the input of a switch circuit C whose two outputs are connected to respective ones of the input terminals b1 and b2 of the piezoelectric transducer P. The intermediate circuit 5 also comprises a stage D for generating a frequency on the basis of the sampling frequency Fe1 or Fe2 as delivered by the modulator circuit 3. This stage D comprises a divide-by-sixteen circuit D1 and a divide-by-thirty-two circuit D2 which divide the received sampling frequency Fe1 or Fe2. The frequency Fe1/16 or Fe2/16 drives the direction in which the rotary register R is read, while the frequency Fe1/32 or Fe2/32 drives the switch circuit C.

With reference to FIG. 4, the transmission system also has a memory M of EEPROM type in which the binary data sequence for transmission is stored, together with a control circuit MP which causes the entire transmission system to operate in response to a key T, for example. Such a transmission system can be integrated in a voice type memory card 10 of standard dimensions.

The transmission system is activated by the key T. The oscillator OS delivers a frequency F0 and the binary data sequence stored in the memory M is transferred serially to the modulator circuit 3.

At its output, the modulator circuit 3 generates a sampling frequency Fe1 or Fe2 depending on the logic state of the sequence bit to be transmitted.

Assume that the logic state of the bit to be transmitted is "0".

The modulator circuit 3 uses its divide-by-m circuit to emit a sampling frequency Fe1=F0/m. This frequency Fe1 is applied to the intermediate circuit 5 for reading the contents of the register R in which the eight logic states "00101111" are stored. The direction in which the register R is read is driven at the frequency Fi1=Fe1/16 as delivered by the divider circuit D1 of the stage D. Thus, the register R will be read at the frequency Fe1 from left to right and then from right to left with a change in reading direction that takes place once every eight clock pulses at the frequency Fe1.

Thus, an intermediate logic signal is obtained at the frequency Fe1 and this signal is received by the switch circuit C so as to be applied in alternation on one or the other of the two input terminals b1 and b2 of the piezoelectric transducer P at a voice frequency Fs1 corresponding to the logic state "0" of the bit to be transmitted. This frequency is determined by the divider circuit D2 of the stage D which controls the switch circuit C, i.e. the frequency Fs1=Fi1/2= Fe1/32.

Thus, the intermediate logic signal is applied to the terminal b1 of the transducer P, and then to the terminal b2 every sixteen clock pulses as defined by the frequency Fe1, and the terminal b1 or b2 to which the intermediate logic signal is not being applied is maintained at a potential of zero volts so as to make it possible to apply a logic excitation signal to the transducer P which is made up of one positive half-cycle and one negative half-cycle, i.e. the same signal half-cycle but of opposite polarity.

The piezoelectric transducer P thus receives an intermediate logic signal which has a waveform as shown in FIG. 3, and the capacitive portion of the impedance presented by the transducer P is advantageously made use of to integrate this intermediate logic signal so as to obtain an acoustic signal of sinusoidal waveform for exciting the transducer P.

The transducer P thus emits the acoustic signal at a voice frequency Fs1=Fe1/32 corresponding to the logic state of the bit to be transmitted.

To transmit a logic "1" state, the modulator circuit 3 delivers the sampling frequency Fe2 using the divide-by-n circuit, and operation continues on the identical principle to that described above but causing the transducer P to output an acoustic signal at a voice frequency Fs2=Fe2/32.

By way of example, for a piezoelectric transducer having a resonant frequency of about 2 kHz, the frequency F0 is selected to be 134.4 kHz, giving the following:

Fe1=134.4/2 kHz;

Fe2=134.4/3 kHz;

Fs1=2100 Hz for logic state "0"; and

Fs2 32 1400 Hz for logic state 1".

When the transmission system is integrated in a "voice" card (FIG. 4) of standard dimensions, the card can then be used with a telephone handset to transmit a binary identification sequence to a receiver connected to the telephone network. The receiver can be server to which the user of the card is requesting access, with the access being enabled only after the server has authenticated the identification sequence.

In general, the identification sequence comprises at least one identity specific to the card, which can be associated with an authentication code corresponding to a cryptogram $C_i$ calculated by the card and whose value is the result of executing an iterative algorithm which takes account at least one of the preceding cryptogram $C_{i-1}$. Such an identification sequence is described in particular in French patent application FR 96/01872.

Transmitting such an identification sequence can require emission of l successive frames each comprising k bytes, thus requiring the key T of the card 10 to be activated for a length of time that is not less than the time required for transmitting the l frames of the sequence.

It is then possible to devise a transmission method and system such that activating the key T of the card 10 causes the l frames to be emitted respectively one after another so long as the key T continues to be activated, with the card 10 terminating emission of the current frame after the key T has been released.

Under such conditions, the transmission method and system can advantageously be associated with an audible response signal being emitted over the telephone line by the receiver once it has received the l frames of the identification sequence correctly. As soon as the user hears this return signal in the earpiece of the telephone set, the user can release the key T of the card. Thereafter, access to the service requested by the user takes place only after the server has authenticated the identification sequence after executing a protocol of the type described in the above-mentioned patent application, for example.

What is claimed is:

1. A method of transmitting a binary data sequence in voice form from a piezoelectric transducer, the method comprising:
    defining a sinewave signal from a stream of pulses each having a logic "0" or a logic "1" state;
    generating a sampling frequency that differs depending on the logic state of the bit of the sequence that is to be transmitted;
    reading the stream of logic pulses at the sampling frequency corresponding to the logic state of the bit to be transmitted so as to obtain an intermediate logic signal;
    applying the intermediate logic signal alternately to one and then to the other of two input terminals of a piezoelectric transducer, at a voice frequency that differs depending on the logic state of the bit to be transmitted, so as to obtain a logic excitation signal made up of a positive half-cycle and of a negative half-cycle;
    reconstituting an acoustic signal having a sinusoidal waveform from the logic excitation signal by making use of the capacitive portion of the impedance of the piezoelectric transducer, in particular in the vicinity of its resonant frequency; and
    causing the transducer to emit the acoustic signal of sinusoidal waveform at the voice frequency which corresponds to the logic state of the bit to be transmitted.

2. A method according to claim 1, comprising defining the sinewave signal from a stream of i logic pulses corresponding to a positive or a negative half-cycle of the signal, storing said stream of pulses in an i-bit rotary register, and reading said register at the sampling frequency corresponding to the logic state of the bit to be transmitted.

3. A method according to claim 1, comprising defining the sinewave signal from a stream of j logic pulses corresponding to a positive or a negative quarter-cycle of the signal, recording said stream of pulses in a j-bit rotary register, and reading said register from left to right and then from right to left at the sampling frequency corresponding to the logic state of the bit to be transmitted.

4. A method according to claim 1, wherein, to transmit a binary data sequence corresponding to an identification sequence via a telephone handset and from a piezoelectric transducer integrated in a voice type memory card and activated by a user using a key on the card, the method comprises:
    subdividing the identification sequence into l successive frames each comprising k bytes;
    causing the piezoelectric transducer to emit the l frames one after the other in repetitive manner so long as the key is activated; and
    causing the receiver to emit an audible return signal over the telephone line after it has correctly received the l frames so as to inform the user that the key on the card can be released.

5. A transmission system comprising:
    a pilot oscillator delivering a periodic signal of frequency F0;
    a modulator circuit of the FSK type connected to the pilot oscillator and also receiving the binary data sequence to be transmitted, so as to generate a sampling frequency that differs depending on the logic state of the bit to be transmitted;
    an intermediate processor circuit connected to the modulator circuit to generate an intermediate logic signal; and
    a piezoelectric transducer whose two input terminals are connected to the intermediate processor circuit via a switch circuit for applying the intermediate logic signal alternately to one and to the other of the input terminals of the piezoelectric transducer at a voice frequency that differs depending on the logic state of the bit to be transmitted so as to obtain a logic excitation signal made up of a positive half-cycle and of a negative half-cycle, the transducer integrating said logic signal so as to reconstitute an acoustic signal having a sinusoidal waveform and emitting said acoustic signal at the voice frequency corresponding to the logic state of the bit to be transmitted.

6. A system according to claim 5, wherein the modulator circuit is constituted by two frequency divider circuits respectively for dividing by m and for dividing by n which circuits are allocated to the logic states "0" and "1" respectively.

7. A system according to claim 5, wherein the intermediate circuit comprises a multiple-bit rotary register storing logic states "0" or "1" corresponding to a succession of logic pulses which define a sinewave signal, the register being connected to the switch circuit, and wherein the intermediate circuit also comprises two frequency divider circuits for driving respectively the direction in which the rotary register is read and the switch circuit.

8. A system according to claim 5, wherein the system is integrated in a voice type memory card (10) of standard dimensions.

* * * * *